United States Patent
Folgar et al.

(10) Patent No.: US 9,981,314 B2
(45) Date of Patent: *May 29, 2018

(54) DIRECT WRITING FOR ADDITIVE MANUFACTURING SYSTEMS

(71) Applicant: 3D SYSTEMS, INC., Rock Hill, SC (US)

(72) Inventors: Luis N. Folgar, Lake Oswego, OR (US); Christian E. Folgar, Langhorne, PA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/362,181

(22) Filed: Nov. 28, 2016

(65) Prior Publication Data
US 2017/0087639 A1    Mar. 30, 2017

Related U.S. Application Data

(63) Continuation of application No. 14/213,731, filed on Mar. 14, 2014, now Pat. No. 9,533,451.
(Continued)

(51) Int. Cl.
*B32B 3/00* (2006.01)
*B22F 7/02* (2006.01)
(Continued)

(52) U.S. Cl.
CPC .............. *B22F 7/02* (2013.01); *B22F 3/1055* (2013.01); *B28B 1/001* (2013.01); *B29C 67/0077* (2013.01); *B29C 67/0081* (2013.01); *B33Y 10/00* (2014.12); *B33Y 30/00* (2014.12); *B33Y 80/00* (2014.12); *H01B 5/16* (2013.01);
(Continued)

(58) Field of Classification Search
CPC .......... B22F 7/02; B33Y 10/00; B33Y 30/00; B33Y 80/00; B28B 1/001; B29C 67/0077; B29C 67/0081
See application file for complete search history.

(56) References Cited

U.S. PATENT DOCUMENTS 6,401,001 B1    6/2002  Jang et al.
2002/0145213 A1   10/2002  Liu et al.
(Continued)

FOREIGN PATENT DOCUMENTS

DE    1020009028105    2/2011
GB    2485848    5/2012
(Continued)

OTHER PUBLICATIONS

PCT International Search Report the International Searching Authority for PCT/US2014/028939 dated Dec. 17, 2014 (5 pages).
(Continued)

*Primary Examiner* — Elizabeth E Mulvaney (57) ABSTRACT

There are provided techniques for direct printing material into parts made by additive manufacturing, such as parts made by laser sintering. The direct printed material may be a metal, elastomer, ceramic, or any other material. Further, the direct printed material is typically different than the laser sintering material. Other aspects of the invention include using direct printed materials in the laser sintered parts to improve part strength, provide multi-materials, selectively provide electrical conductivity, and/or provide other desirable features to the parts.

12 Claims, 7 Drawing Sheets

Related U.S. Application Data (60) Provisional application No. 61/791,293, filed on Mar. 15, 2013.

(51) Int. Cl.
*B22F 3/105* (2006.01)
*B33Y 10/00* (2015.01)
*B33Y 30/00* (2015.01)
*B33Y 80/00* (2015.01)
*B28B 1/00* (2006.01)
*B29C 67/00* (2017.01)
*H01B 5/16* (2006.01)
*B29K 105/00* (2006.01)
*H01B 1/02* (2006.01)

(52) U.S. Cl.
CPC ... *B22F 2003/1056* (2013.01); *B22F 2301/10* (2013.01); *B22F 2301/255* (2013.01); *B22F 2302/253* (2013.01); *B22F 2302/45* (2013.01); *B22F 2998/10* (2013.01); *B29K 2105/251* (2013.01); *B29K 2995/0005* (2013.01); *B29K 2995/0007* (2013.01); *H01B 1/02* (2013.01)

(56) References Cited

U.S. PATENT DOCUMENTS

| | | |
|---|---|---|
| 2010/0069627 A1 | 4/2010 | Han-Pei |
| 2010/0279007 A1 | 11/2010 | Briselden et al. |
| 2014/0252685 A1 | 9/2014 | Stucker et al. |
| 2014/0255666 A1 | 9/2014 | Stucker et al. |
| 2015/0197062 A1 | 7/2015 | Shinar et al. |

FOREIGN PATENT DOCUMENTS

| | | |
|---|---|---|
| WO | 2002042023 | 5/2002 |
| WO | 2012040563 | 3/2012 |
| WO | 2012143923 | 10/2012 |

OTHER PUBLICATIONS

PCT Written Opinion of the International Searching Authority for PCT/US2014/028939 dated Dec. 17, 2014 (8 pages).

DIRECT WRITING FOR ADDITIVE MANUFACTURING SYSTEMS

CROSS REFERENCE TO RELATED APPLICATIONS

This application is a continuation of U.S. application Ser. No. 14/213,731, filed Mar. 14, 2014, which claims the benefit of U.S. Provisional Application No. 61/791,293, filed Mar. 15, 2013, the disclosure of which is expressly incorporated herein by reference in its entirety.

STATEMENT REGARDING FEDERALLY SPONSORED RESEARCH OR DEVELOPMENT

This invention was made with Government support under Agreement/Contract No. FA8650-10-5705 awarded by the US Air Force Research Laboratory. The Government has certain rights in the invention.

FIELD OF THE INVENTION

The present invention is related to additive manufacturing processes, and more particularly, to direct writing or printing of a second material during an additive manufacturing process to improve the quality and/or functionality of parts made.

BACKGROUND OF THE INVENTION

Additive manufacturing technologies create physical objects from three-dimensional (3D) data, typically by providing, curing, or fusing material in a layer-by-layer manner. Additive manufacturing technologies include but are not limited to extrusion based 3D printing, stereolithography, laser sintering, multi jet modeling, binder-on-powder 3D printing, laminated object manufacturing, and other technologies. Many of these technologies are often used to make objects (parts) from only a single material or from a few materials to provide single-functional parts, which may limit the usefulness of such parts.

BRIEF SUMMARY OF THE INVENTION

The various embodiments of the present invention address the above needs and achieve other advantages by providing direct printing of a second material during the additive manufacturing process using a first material. By printing a second material into a part made of a first material, the part can be strengthened, made electrically conductive and/or flexible (in desired locations) and/or to exhibit other preferable functions or features. Printing a second material into a part, such as in the case of electrical components, may allow for cost reduction and better turn-around time to produce the part, partial or total concealment of electrical components in the part and/or reduced weight of the part.

In one example implementation, a method is disclosed for fabricating a three-dimensional object from digital data representing the object. Such method comprises providing a first layer of particulate material and consolidating at least a first portion of the first layer of particulate material to form a consolidated first cross-section of the object. A first portion of conductive material is applied to the consolidated first cross-section, and a second layer of particulate material is applied to the consolidated first cross-section of the first layer. Additionally, at least a second portion of the second layer of particulate material is consolidated to form a consolidated second cross-section of the object. Moreover, as understood by one of ordinary skill in the art, the foregoing steps can be repeated a sufficient number of times to form the complete 3D object. It is to be understood that the previous and following description of steps related to first and second layers of particulate material and/or related to first and second portions of conductive material can also be extended to any number of additional layers and portions. In general, n layers of particulate material and m layers or portions of conductive material can be provided in an alternating or periodic manner described hereinabove to provide a 3D object having an electrically conductive network within the object, where n and m can be arbitrary finite integers, as required for a particular additive manufacturing process. In addition, such an object having an electrically conductive network can be provided by a method described herein in a continuous and/or in situ manner, as opposed to being provided by pausing an additive manufacturing process and manually inserting an electronic component onto a consolidated portion of the object, followed by restarting the additive manufacturing process.

In certain examples of a method described herein, consolidating the first and/or second portion of the first and/or second layers of particulate material comprises exposing the first and/or second portion to electromagnetic radiation, thereby sintering the particulate material in the exposed first and/or second portion. In some cases, the electromagnetic radiation can comprise laser light. In another aspect, consolidating the first and/or second portion of the first and/or second layers of particulate material comprises applying a binder material to the first and/or second portion, such as a fluid binder material provided by a printhead. In another implementation, the applying of a second layer of particulate material comprises applying the second layer such that the second layer is of a height selectively greater than, less than, or approximately equal to the height of the first portion of the conductive material. In a further example, a second portion of conductive material is applied to the consolidated second cross-section of the object to be selectively in or out of electrical contact with the first portion of conductive material. The method may also include providing a housing and both a first additive manufacturing device and a second device in the housing, wherein the consolidating of the first portion of the first layer of particulate material is performed using the first additive manufacturing device, and wherein the consolidating of the second portion of the second layer of particulate material is performed using the second device. In one implementation of the method, the first additive manufacturing device is a selective laser sinter device and/or the second device is an atomized aerosol particle deposition device, a micro-capillary deposition device, a micro-dispense pump deposition device and/or a 3D printer device. Further, in one implementation, the conductive material used in the method could be a conductive ink, including a conductive fluid ink.

In another example implementation, a method is provided for fabricating a three-dimensional object from digital data representing the object. Such method comprises providing a substantially inert chamber, a selective laser sintering device, a 3D printer in the chamber, and a first layer of particulate material in the chamber. A portion of the first layer of particulate material is sintered using the selective laser sintering device to form a sintered first cross-section of the object. A first portion of conductive material is deposited on the sintered first cross-section, and a second layer of particulate material is applied to the sintered first cross-section of the first layer. Additionally, a portion of the second layer of particulate material is sintered using the selective laser sintering device to form a sintered second cross-section of the object. Again, as described hereinabove, one or more of the foregoing steps can be repeated to form the complete 3D object.

Another example implementation includes an apparatus for fabricating a three-dimensional object from digital data representing the object, the apparatus comprising a housing and a first additive manufacturing device positioned in the housing. The first additive manufacturing device has a bed configured for carrying a first layer of particulate material and to consolidate a portion of the first layer of particulate material to form a consolidated first cross-section of the object. A second device is positioned in the housing and is configured to deposit a first portion of conductive material on the consolidated first cross-section. The first additive manufacturing device is also configured to apply a second layer of particulate material to the consolidated first cross-section of the first layer, including in the same region as the first portion of conductive material, and to selectively consolidate a portion of the second layer of particulate material to form a consolidated second cross-section of the object. Additionally, the second device is configured to apply a second portion of conductive material to the consolidated second cross-section of the object.

In certain examples, the first additive manufacturing device is configured to form the consolidated second cross-section of a height that is selectively less than, greater than, or equal to the height of the first portion of the conductive material. Implementations may include the second device being configured to selectively form the second portion of conductive material in electrical contact with the first portion of conductive material.

Another example implementation includes an apparatus for fabricating a three-dimensional object from digital data representing the object, the apparatus having a housing and a selective laser sintering device positioned in the housing. The selective laser sintering device has a bed configured for carrying a first layer of particulate material, and the selective laser sintering device is also configured to sinter a portion of the first layer of particulate material to form a sintered first cross-section of the object. A 3D printer or other device capable of x,y-plotting is positioned in the housing and is configured to deposit a first portion of conductive material on the sintered first cross-section. The selective laser sintering device is configured to apply a second layer of particulate material to the sintered first cross-section of the first layer, and the selective laser sintering device is configured to selectively sinter a portion of the second layer of particulate matter to form a sintered second cross-section of the object. Additionally, the 3D printer or other device is configured to apply a second portion of conductive material to the sintered second cross-section of the object.

In another aspect, objects formed or made by additive manufacturing are described herein. In some embodiments, such an object comprises a plurality of stacked layers formed from a particulate build material, the layers being bonded to one another in the z-direction, and an electrically conductive network disposed within the layers of particulate build material, the electrically conductive network extending in the z-direction through a plurality of the layers of particulate build material. For example, in some cases, the electrically conductive network extends in the z-direction through at least about 10 layers, at least about 20 layers, at least about 100 layers of the particulate build material, or at least about 1000 layers of the particulate build material. Further, the electrically conducive network of an object described herein can be a continuous network formed from a conductive material described herein, where a "network" is to be understood to refer to an extended material or material phase disposed within the object. Moreover, the electrically conductive network of an object can have a feature resolution of about 100 um or less.

These and other implementations are described in greater detail in the description that follows.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing improvements to additive manufactured objects are described and shown in the accompanying drawings with regard to specific types of laser sintered objects, it is envisioned that the functionality of the various apparatus and methods may be applied to any now known or hereafter devised additive manufacturing technologies and additive manufactured objects in which it is desired to provide a second material within a part made by additive manufacturing with a first material. Like numbers refer to like elements throughout.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications, variations, and other embodiments are intended to be included within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

Figure 1:
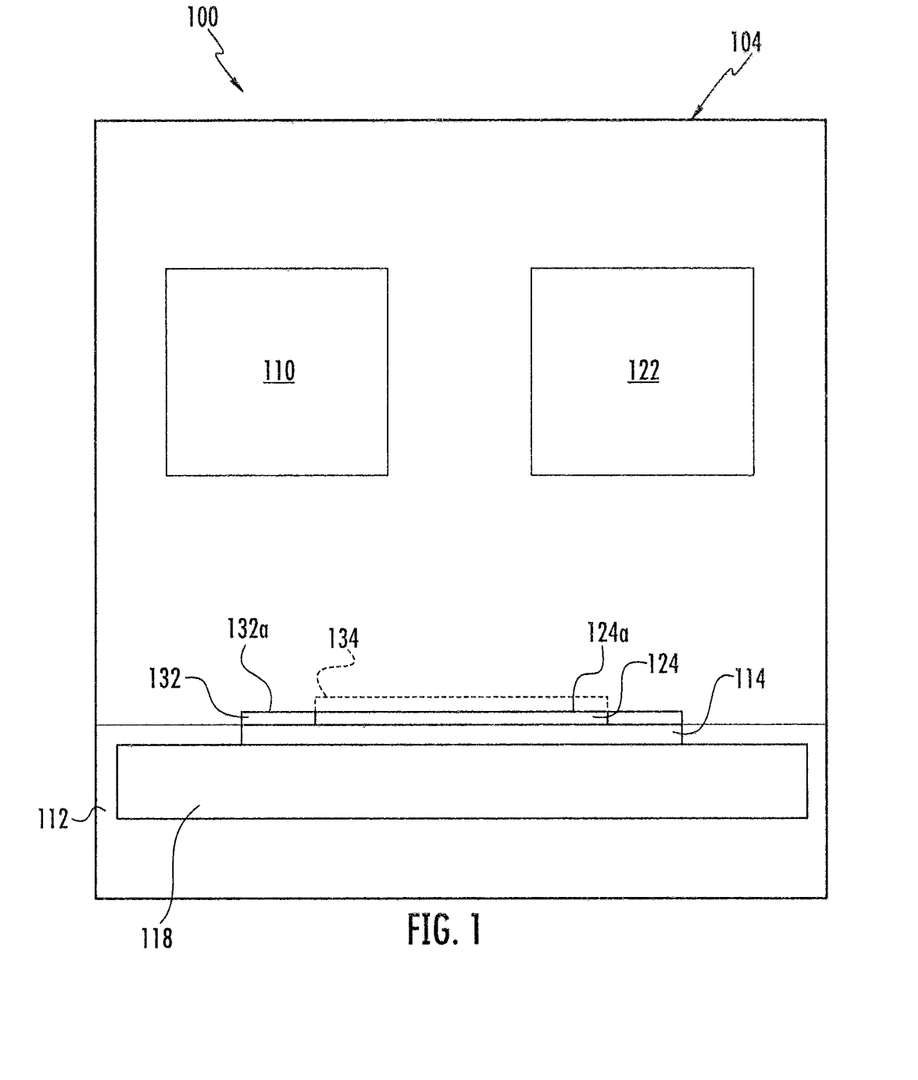
FIG. 1 is a schematic illustration of a direct printing system for additive manufacturing.
Figure 2:
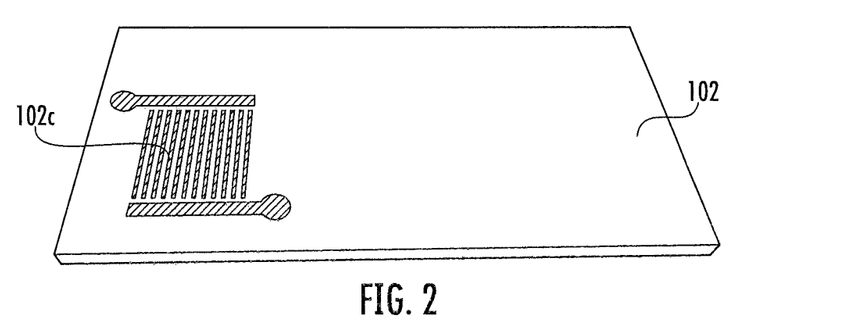
FIGS. 2 and 3 are illustrations of an example object which may be made using additive manufacturing techniques.
Figure 3:
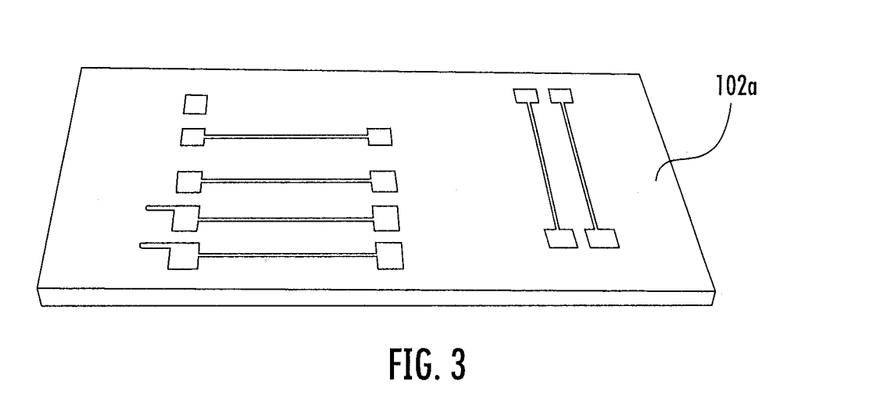
Figure 6:
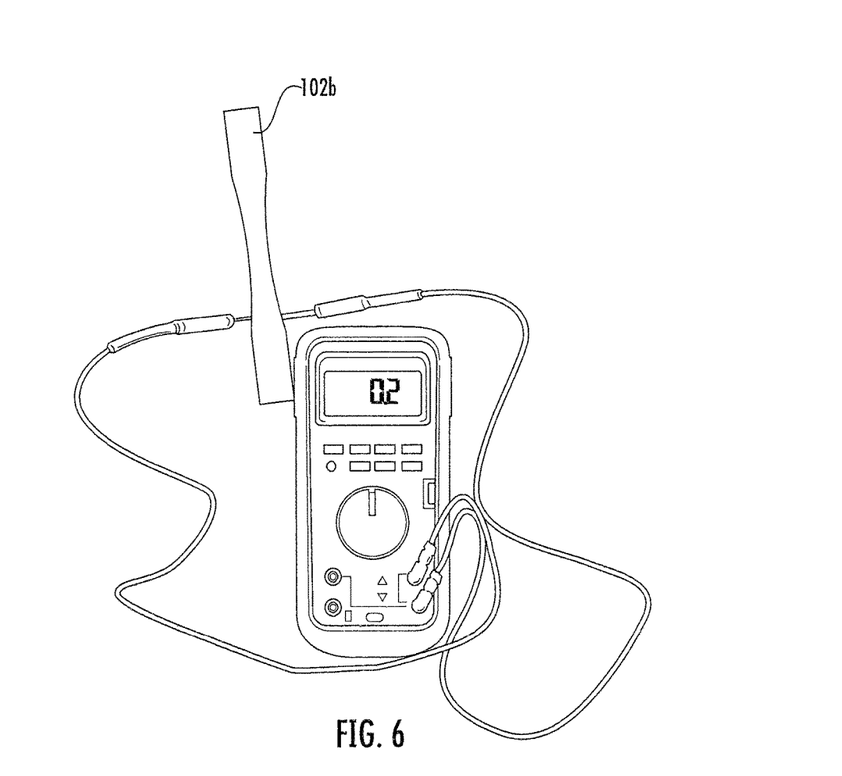
FIG. 6 is an illustration of an example object which may be made using additive manufacturing techniques.

As shown in FIGS. 1 and 2, in one example implementation, an apparatus, generally 100, for fabricating an example three-dimensional object, generally 102, from digital data representing the object, includes a housing, generally 104, and a first additive manufacturing device, such as a selective laser sintering device, generally 110, positioned in the housing 104. Example variations of the object are objects 102a and 102b, which are shown in FIGS. 3 and 6.

The selective laser sintering (SLS) device 110 includes a bed 112 configured for carrying a first layer of particulate material. The SLS device 110 is configured to consolidate, or, sinter, a portion of the first layer of particulate material, generally 118, to form a sintered first cross-section 114 of the object, such as exposing the portion to laser light. While the first additive manufacturing device predominantly discussed herein is a SLS device, it is to be understood that other additive manufacturing devices using particulate build materials, such as a binder-on-powder 3D printing device, can also be used. For example, in one implementation, a binder-on-powder 3D printing system could be used in place of and in a similar manner as a selective laser sintering system. If such a binder-on-powder 3D printing system is used, consolidation of the portion of the first layer of particulate material 118 would be effected by applying a binder material to the first portion of the particulate material 118 and/or the second portion of particulate material 118.

A second device, such as a 3D printer (or other direct-write device, including without limitation, a printer/plotter or other material deposition device movable in at least an x-y plane), generally 122, is positioned in the housing 104 and is configured to deposit a first portion 124 of conductive material on the sintered first cross-section 114. The SLS device 110 is also configured to apply a second layer of particulate material to the sintered first cross-section 114 of the first layer and to selectively consolidate, or, sinter, a portion of the second layer of particulate material to form a sintered second cross-section 132 of the object. Additionally, the 3D printer 122 is configured to apply a second portion 134 of conductive material to the sintered second cross-section 132. While the second device predominantly discussed herein is genericly referred to as a 3D printer, it is to be understood that other any 3D printer not inconsistent with the objectives of the present disclosure could be used. For example, a 3D printer can be an extrusion based 3D printer or a multi jet modeling 3D printer. In addition, as described hereinabove, other plotting or material deposition devices could also be used, such as an atomized aerosol particle deposition, micro-capillary deposition, or micro-dispense pump deposition device (none shown). Other technologies may also be used, if desired.

In certain examples, the SLS device 110 is configured to form the sintered second cross-section 132 of a height 132a that is selectively less than, greater than, or equal to the height 124a of the first portion 124 of the conductive material 128. As understood by one of ordinary skill in the art, such SLS device 110 can be configured to form a sintered cross-section such as sintered cross-section 132 having a desired height or thickness in a variety of ways, including based on an amount of downward translation of a stage disposed beneath the powder bed and the printed article being formed thereon. Further, implementations may include the device 122 being configured selectively to form the second portion 134 of conductive material in electrical contact with the first portion 124 of conductive material to facilitate electrical conductivity in the z-axis or build direction of the SLS process, or alternatively to form the second portion 134 of conductive material 134 out of contact with the first portion 124 such that an electrically insulating layer of sintered material is between the first portion 124 and the second portion 134 of conductive material. As with SLS device 110, 3D printer device 122 can be configured to provide a configuration of first and second portions of conductive material 124 and 134 in any manner not inconsistent with the objectives of the present disclosure, including by reference to computer-assisted design (CAD) data corresponding to a desired electronic component, electrically conductive network, or other feature to be embedded in the 3D object.

As set forth above, the method for fabricating the object 102 includes, in one implementation, providing first layer of particulate material 118 and sintering or otherwise consolidating at least a first portion of the first layer of particulate material to form a consolidated first cross-section 114 of the object 102. The first portion 124 of conductive material is applied to the first cross-section 114 (which could be in the form of an embedded sensor 102c (FIG. 2), and a second layer of particulate material 118 is applied to the first cross-section of the first layer 114. A second portion of the second layer of particulate material is sintered or otherwise consolidated to form a consolidated second cross-section 132 of the object 102.

In certain examples of such method, sintering or otherwise consolidating the first and/or second portion of the first and/or second layers, respectively, of the particulate material 118 comprises exposing such first and/or second portion to electromagnetic radiation, such as through the use of first additive manufacturing device 110 (which could be a selective laser sintering device), thereby sintering the particulate material 118 in the first and/or second portion exposed to such radiation. In another aspect, the electromagnetic radiation may comprise laser light (which could be through use of a selective laser sintering device). In other cases, consolidating the first and/or second portion of particulate material comprises applying a fluid binder material (not shown) to the first and/or second portion.

In another implementation, the applying of a second layer of particulate material 118 comprises the second layer being of a height 132a selectively greater than, less than, or approximately equal to the height 124a of the first portion 124 of the conductive material. In a further example, a second portion 134 of conductive material is applied to the consolidated second cross-section 132 of the object 102, 102a, 102b to be selectively in or out of electrical contact with the first portion 124 of conductive material.

In addition, in some cases, the applying of a second layer of particulate material 118 is not carried out until the first portion of conductive material 124 is in a cured or otherwise solidified state. In such a cured or otherwise solidified state, the first portion of conductive material 124 can have a sufficiently high viscosity to maintain the resolution at which the first portion 124 was deposited, even if a rolling or planarization process is used to provide the second layer of particulate material 132, and the second layer of particulate material 132 is of a height 132a that is less than the height 124a of the first portion of the conductive material 124. Thus, in some embodiments, a method described herein further comprising curing or solidifying the first portion of conductive material prior to applying a second layer of particulate material. In some cases, such curing or solidifying can take place instantly or substantially instantly due to the high temperature of the environment used to provide second layer of particulate material, as may occur, for example, in a laser sintering process.

The "resolution" of a portion of conductive material, for reference purposes herein, can be the smallest controllable physical feature size of the portion. For example, the resolution can correspond to the printing or deposition resolution of the apparatus used to deposit the portion. The resolution of a portion of conductive material can be described in terms of a unit of distance such as microns (μm), or in terms of dots per inch (dpi). As understood by one of ordinary skill in the art, a higher resolution corresponds to a higher dpi value but a lower distance value in μm. In some cases, for instance, portion of conductive material described herein can have a resolution of about 1000 μm or less, about 500 μm or less, about 200 μm or less, about 100 μm or less, or about 50 μm or less. In some embodiments, a portion of electrically conductive material has a resolution between about 50 μm and about 1000 μm, between about 50 μm and about 500 μm, between about 100 μm and about 300 μm, or between about 200 μm and about 500 μm. Correspondingly, in some instances, a portion of conductive material described herein has a resolution of at least about 50 dpi, at least about 100 dpi, at least about 200 dpi, at least about 250 dpi, at least about 400 dpi, or at least about 500 dpi. In some cases, the resolution of a portion of conductive material is between about 50 dpi and about 600 dpi, between about 50 dpi and about 300 dpi, or between about 50 dpi and about 200 dpi.

The method may also include providing the housing 104 and both the first additive manufacturing device 110 and the second device 122 in the housing 104, wherein the consolidating of the first portion of the first layer of particulate material 118 is performed using the first additive manufacturing device 110, and wherein the consolidating of the second portion of the second layer of particulate material 118 is performed using the first device 110. In one implementation of the method, the first additive manufacturing device could be a selective laser sinter device 110 (FIG. 1) and/or the second device could be an atomized aerosol particle deposition device, a micro-capillary deposition device, a micro-dispense pump deposition device and/or a 3D printer device (none shown). Further, in one implementation, the conductive material used in the method could be a conductive ink, including a fluid conductive ink.

In another example implementation, a method is provided for fabricating a three-dimensional object from digital data representing the object. Such method comprises providing a housing 110 in the configuration of a substantially inert chamber, the selective laser sintering device 110, a 3D printer 122 in the chamber, and a first layer of particulate material in the chamber. A portion of the first layer of particulate matter is sintered using the selective laser sintering device to form a sintered first cross-section 114 of the object 102. A first portion of conductive material is deposited on the sintered first cross-section, and a second layer of particulate material is applied to the sintered first cross-section of the first layer. Additionally, a portion of the second layer of particulate matter is sintered using the selective laser sintering device 110 to form a sintered second cross-section 132 of the object 118. An "inert" chamber, for reference purposes herein, can comprise a chamber containing an inert gas such as nitrogen or argon, or a chamber that is free or substantially free of water and/or oxygen, A chamber that is "substantially" free of water and/or oxygen, for reference purposes herein, comprises less than about 1000 ppm, less than about 100 ppm, less than about 50 ppm, or less than about 10 ppm water and/or oxygen.

In another example implementation of a method for fabricating a three-dimensional object from digital data representing the object, suitable additive technologies to use in such method may integrate an in-situ hybrid direct-write manufacturing method using amorphous and semi-crystalline polymers as extruded filaments or deposited powders as particulate material 118. Additive manufacturing (AM) processes may include stereo lithography (SLA), fused deposition modeling (FDM), and selective heat sintering (SHS) instead of or in addition to SLS.

Further, any combination of materials not inconsistent with the objectives of the present disclosure can be used to form an object according to a method described herein. In some cases, for instance, a powder or particulate build material described herein can comprise an organic material, an inorganic material, or a composite material. For example, in some cases, a particulate material comprises or is formed from a ceramic material such as alumina or an aluminosilicate. In other cases, a particulate material comprises or is formed from a polymeric material such as an acrylic resin, polyethylene, polypropylene, polyethylene oxide, polypropylene oxide, polyethyleneimine, polystyrene, a polyurethane, a polyurea, a polyester, a polyamide such as nylon, a polyimide, poly(ether ether ketone) (PEEK), poly(ether ketone ketone) (PEKK), poly(ether ketone) (PEK), poly(arylether ketone) (PAEK), poly(ether ether ketone ketone) (PEEKK), poly(ether ketone ether ketone ketone) (PEKEKK), carboxymethyl cellulose, a gelatin, a starch, chitin, chitosan, or a combination of one or more of the foregoing. Additional non-limiting examples of particulate materials suitable for use in some embodiments described herein are described in U.S. Pat. Nos. 5,149,548; 5,204,055; 5,733,497; 7,300,613; and 8,157,908.

In addition, a powder or particulate build material described herein can also have any physical dimensions not inconsistent with the objectives of the present disclosure. In some implementations, for instance, a powder or particulate material has an average particle size of less than about 100 μm. In some embodiments, a powder or particulate material has an average particle size between about 30 μm and about 70 μm. Alternatively, in other embodiments, a powder or particulate material has an average particle size greater than about 100 rim.

Similarly, any conductive material not inconsistent with the objectives of the present invention may be used. In some cases, the conductive material is a fluid conductive material, such as conductive ink. Moreover, in some implementations, a conductive material comprises or is formed from an inorganic material such as a metal, alloy, or combination of metals. Non-limiting examples of metals suitable for use in some embodiments described herein include silver, gold, copper, and alloys, mixtures, or combinations thereof. Other metals may also be used. A conductive material may also be an organic material, such as a conductive polymeric or oligomeric material. Further, a conductive material described herein can include an organic or inorganic material described above dispersed in a liquid carrier, such as water or an organic solvent.

Moreover, while conductive materials have been described herein, it is also possible to carry out a method described herein in which the conductive material is supplemented with or replaced by a non-conductive material to provide an embedded feature or network within an object made by additive manufacturing.

Some embodiments described herein are further illustrated in the following non-limiting examples. In one example implementation, two additive manufacturing techniques are combined to fabricate a part with embedded traces of conductive material, such as ink, using thermoplastic materials.

For instance, in one non-limiting example, the compatibility of Nylon12 substrates to conductive inks was evaluated. Cabot CSD-32 ink was used with Optomec's Aerosol Jet®, and 40-3920R HVA was used with nScrypt's Smart-Pump system. The adhesion and flexibility of the inks was demonstrated with a 3-point-bend test designed to print traces of conductive ink on SLS tensile bars.

In another non-limiting example, the viability of performing in-situ printing traces of conductive Ag (4020R HVA dissolved in 15-25 wt % Xylene) was also shown by retrofitting an open source 3D printer (Fab@Home) to a 2500-CI SLS platform. An ASTM D-638 test bar was produced with the laser scanner; a conductive trace was printed on top of the sintered Nylon surface, and a layer of powder was rolled over and sintered to finish the test bar. Conductivity was tested with a multi-meter where a resistance of 0.3Ω was shown along the XY-axis of the SLS process.

Various technologies can be implemented as additive manufacturing devices. For example, the Aerosol Jet®, by Optomec, is a mask-less, meso-scale, material deposition system that uses hydrodynamic deposition of atomized aerosol particles, and a motion-controlled system which allows for creation of complex patterns on the substrate without making contact with the surface. The Aerosol Jet process starts with the atomization of a liquid sample of the material to print, creating a dense aerosol of droplets with diameters between 1 and 5 microns that are transported to the deposition head using an inert carrier gas. The Micro-Pen® writing system, by MicroPen Technologies, is a micro-capillary technology where a pen tip "rides" on the surface of the material without touching the substrate surface. It uses a proprietary positive displacement pumping method to control ink volume of flowable materials onto a surface. The SmartPump™, by nScrypt, uses a micro-dispense pump to deposit material onto the substrate of contact. It uses positive pressure and a computer controlled needle valve that provides active valving and suck-back to control flow characteristics.

In another non-limiting example, Aerosol Jet technology from Optomec was used as a base board to adapt an engineered fixture that would mimic the SLS environment. A miniature powder bed was used where Nylon12-substrate conditions could be tested. A material delivery mechanism was used that mimics the deposition method in the laser sintering process. The miniature SLS fixture consisted of a powder reservoir partition where powder was placed and then spread across a moving z-axis stage with 10 mm travel distance. The leveling of powder was done with a straight edge. The part bed lowering/rising mechanism used a micrometer screw to level the powder bed in 0.004-0.005" layer thickness increments.

Figure 4A:
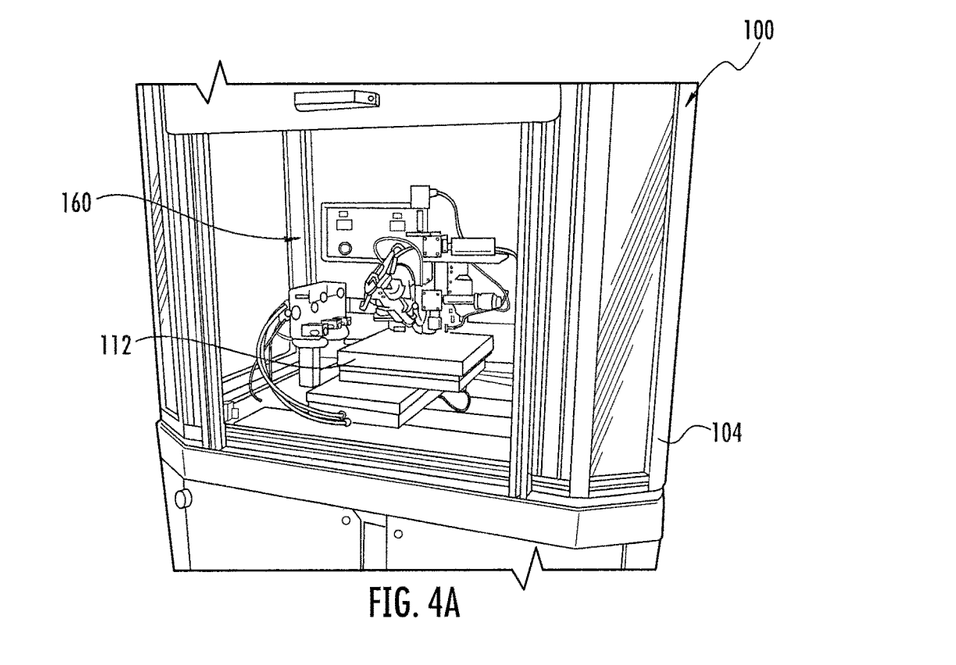
FIGS. 4A and 4B are illustrations of one implementation of a powder delivery mechanism and an atomized aerosol particle material deposition device.
Figure 4B:
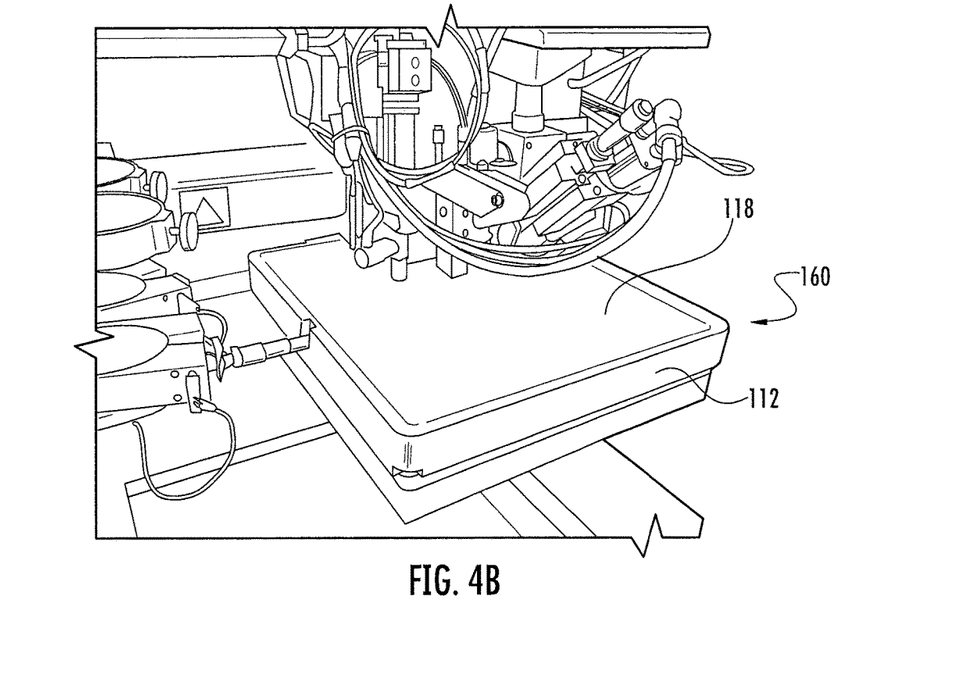

Thin silicone heating pads were placed at the bottom and side walls of the SLS fixture to achieve melting of the PA12 powder at 175° C. A radiant heating strip was placed above the powder bed to maintain a variable current open-loop heating source to control the processing temperature of the polymer surface. An external 40W $CO_2$ laser was used to melt the nylon. Layers of PA12 where sintered with the laser system and then quickly transferred the powder bed spreader fixture to the Aerosol Jet system. The mechanism was installed and tested (FIGS. 4A and 4B). The mechanism, generally 160, was heated from the bottom utilizing the heat from the platen of the Optomec Aerosol Jet Machine. A method to heat the top of the powder bed during sintering was also necessary. Heat from the machine's bottom plate kept the sintered powder from curling.

Aerosol Jet and nScrypt technologies were used to print silver inks on the surfaces of these samples (FIGS. 2 and 3). The specimens showed high electrical conductivity when measured with a regular ohm meter.

In another non-limiting example, nylon tensile bars were produced on a 3D Systems S-Pro60 SLS machine to evaluate ink behavior under stress. A conductive print trace on a tensile bar measuring 10.16 cm long and 0.3175 cm wide and 10 layers thick (approximately 0.00562 cm) was tested at different distances with a multi-meter to demonstrate connectivity along the trace. Results were compared to theoretical data calculated with equation $$R = \frac{\rho \cdot L}{A},$$

where ρ is the resistivity of the material measured in Ω·cm, L is the length of the conductive trace, and A is the cross-sectional area. Electrical conductivity was not lost during strain test applied to the part.

In another non-limiting example, the behavior of a direct-write (DW) method in a SLS environment at the laser sintering station was evaluated. This included the design and modification of an apparatus adapted to the SLS machine, with the purpose of studying the deposition of conductive ink in the SLS environment. Viability of printing traces of conductive Ag was shown by retrofitting an open source 3D printer (Fab@Home) to a 2500-CI SLS platform. An ASTM D-638 test bar was produced with the laser scanner; a conductive trace was printed on top of the sintered nylon surface, and a layer of powder was rolled over and sintered to finish the test bar. Conductivity was tested with a multi-meter where a resistance of 0.3Ω was shown along the XY-axis of the SLS process.

Figure 5A:
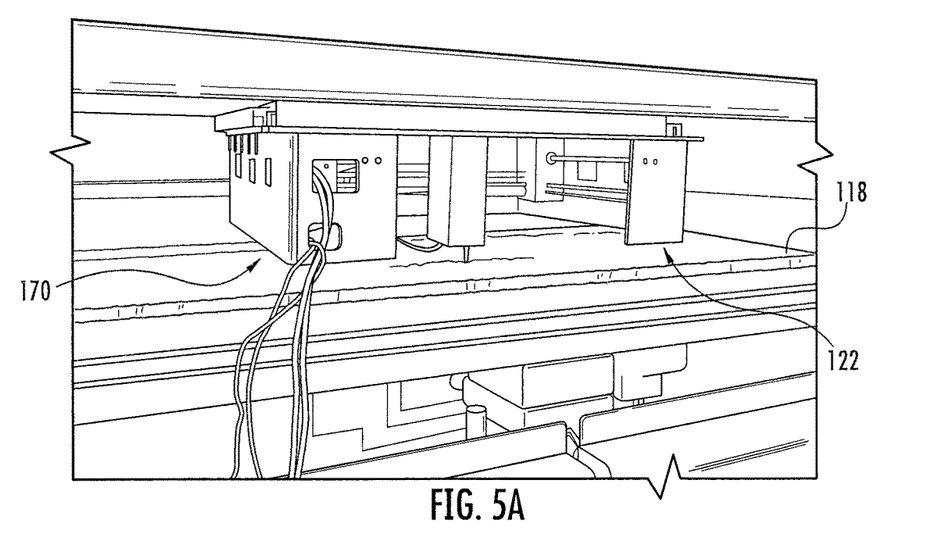
FIGS. 5A and 5B are illustrations of a 3D printer inside of a selective laser sintering device.
Figure 5B:
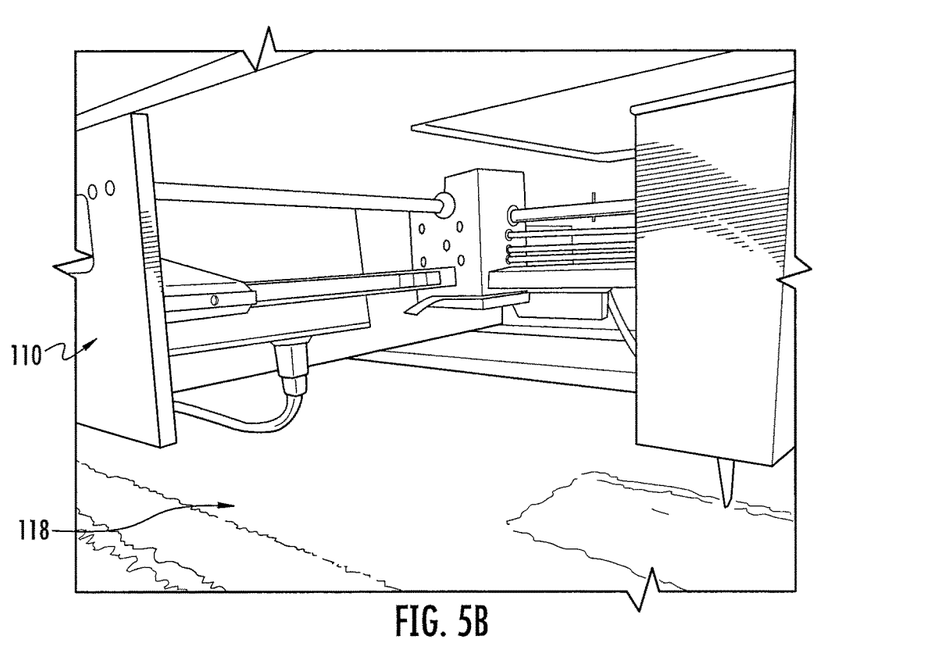

The integration of a DW into an SLS system was evaluated by retrofitting a Fab@Home 3D printer 122 to the frame of a DTM 2500CI SLS system. The retrofitted printer frame, generally 170, was made with aluminum to address the PA12 processing temperature at 175° C., required to melt the powder (FIGS. 5A and 5B). With the 3D printer 122, the powder bed may remain stationary while the plotter feature of the FAB@HOME device has its material deposition head move instead. The processing temperature for PA12 powder may be approximately 175° C. in order to melt the powder. In the event such 3D printer 122 cannot withstand prolonged exposure to such temperature in housing 104 and/ or for other reasons, the 3D printer 122 is configured to be selectively moved into housing 104 when needed for deposition of conductive, structural, or other material and then withdrawn from housing 104 once such deposition has been made.

Traces of conductive ink (4020R HVA dissolved in 15-25 wt % Xylene) were printed inside a 2500-CI SLS platform. ASTM D-638 test bars were produced with the laser scanner; a conductive trace was printed on top of the sintered Nylon surface, and a layer of powder was rolled over with roller 160 (FIGS. 8A and 8B) and sintered to finish the test bar (FIG. 6). The deposition methods were varied in order to determine the optimum deposition sequence to produce parts with embedded conductive traces. Conductivity was tested with a multi-meter where a resistance of 0.3Ω was shown along the XY-axis of the SLS process. The experimental sequences are illustrated in FIGS. 7, 8A, 8B, and 8C.

Figure 7:
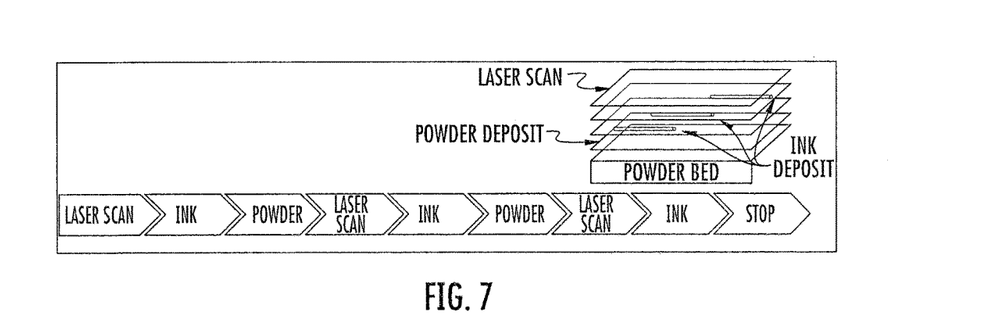
FIG. 7 is a graphical illustration of sintering and printing configurations used to produce parts by selective laser sintering having embedded conductive paths.

FIG. 7 illustrates sintering and printing configurations used to produce SLS parts with embedded conductive paths, using laser scans by the SLS 110, conductive ink deposition by a second device, such as 3D printer 122, and particulate deposition by the SLS.

Figure 8A:
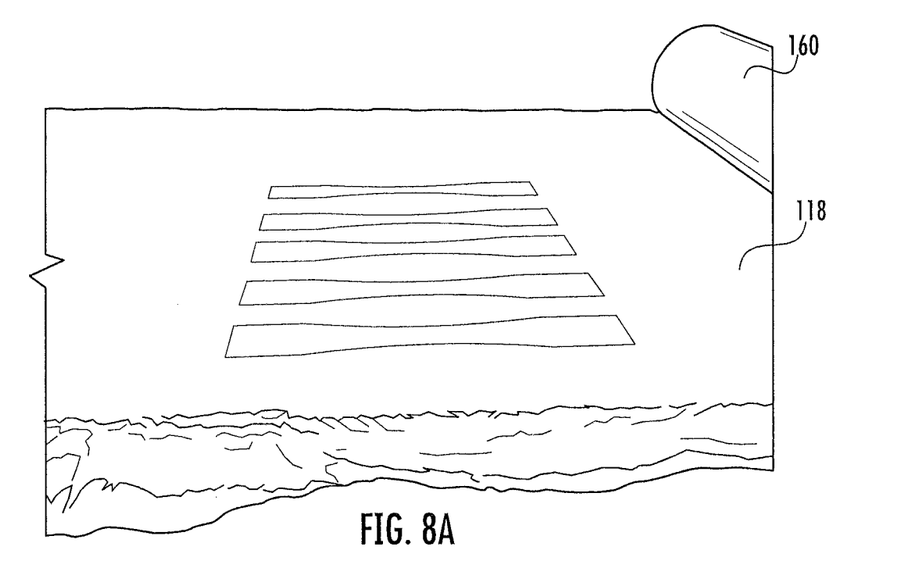
FIGS. 8A-8C are illustrations of in-situ direct-writing and selective laser sintering stages during material deposition and printing.
Figure 8B:
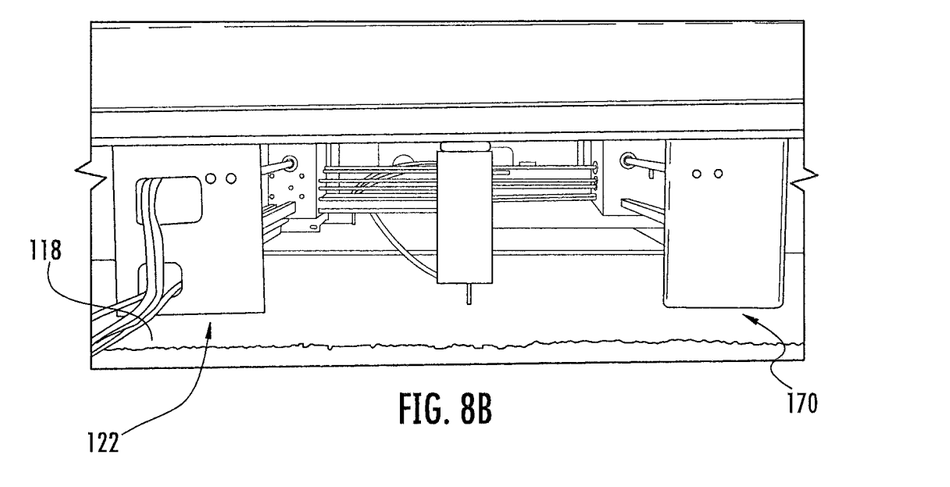
Figure 8C:
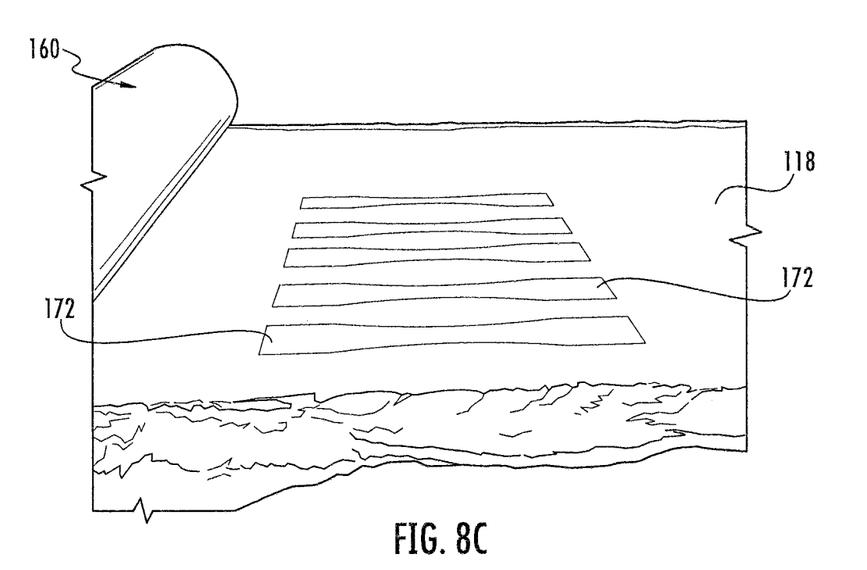

FIGS. 8A-8B show the in-situ direct-writing/selective laser sintering stages during printing and material deposition. FIG. 8A shows a material deposition roller 160 direction of left to right, and FIG. 8C shows such roller 160 moving right to left, with sintered portions 172 being shown. The steps described below were generally followed in order to produce the parts:
1. Inert process chamber 104 and warm-up Nylon 12 powder;
2. 30 min SLS build warm-up stage;
3. Test bars begin to sinter layers;
4. (Process pause);
5.—3D printer moved in and setup (FIG. 8A);
6.—Conductive ink deposition (FIG. 8B);
7. —3D printer moved out (FIG. 8C);
8. (Process resumes);
9. Roller 160 puts down powder;
10. Sintering of a layer;
11. (Process pause);
12.—3D printer moved in and setup;
13.—Conductive ink deposition;
14.—3D printer moved out;
15. (Process resumes); and
16. Sintering continues to finish.

It should be noted that a 3D printer could be chosen or otherwise designed that could withstand the operating temperatures within the chamber, in which case the 3D printer could reside within the chamber and the steps of moving the 3D printer in and out of the chamber could be eliminated.

Silver lines inside PA12 bars 150 (FIG. 3) demonstrate the technique for embedded sensor printing. Electrical conductivity in the z-direction was demonstrated for multilayer experiments, for a 5 layer print. Specifically, conductive silver ink was printed between particulate material layers for 5 repetitions, with successful conductivity readings ranging between 0.30Ω (1-2), to 6.4Ω (4-5).

A scanning electron microscope (SEM) analysis was conducted to study and document the microstructure of the silver deposited on the Nylon 12 as a polymer substrate. The results showed a single trace of Ag printed in-situ on top of a previously melted (by the $CO_2$ laser) layer of the Nylon 12.

The foregoing implementations include examples using multiple additive manufacturing technologies for the fabrication of complex parts with embedded sensors using direct-write/direct-print technologies combined with additive manufacturing techniques such as a selective laser sintering process and laser sintering materials. The various examples above address providing direct printing of a second material during an additive manufacturing process using a first material. By printing a second material into a part made of a first material, desired attributes may be obtained, such as strengthening a part, making a part electrically conductive, making a part flexible (in selected locations) and/or to exhibit other preferable functions or features. Printing a second material into a part, such as in the case of electrical components, may allow for cost reduction, improved turn-around times, and/or concealment of electrical, structural, mechanical, or other components.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A method of fabricating a three-dimensional object from digital data representing the object, the method comprising:
forming a first cross-sectional layer of the object in a bed of particulate material, wherein the first cross-sectional layer is electrically insulating;
forming a second cross-sectional layer of the object over portions of the first cross-sectional layer, wherein the second cross-sectional layer is electrically conductive; and
forming a third cross-sectional layer of the object over portions of the second cross-sectional layer, wherein the third cross-sectional layer is electrically insulating.

2. The method of claim 1, wherein forming the first cross-sectional layer of the object comprises exposing the bed of particulate material to electromagnetic radiation for sintering and consolidating a plurality of particulates disposed in the bed of particulate material.

3. The method of claim 1, wherein forming the first cross-sectional layer of the object comprises applying a fluid binder material to the bed of particulate material for consolidating a plurality of particulates disposed in the bed of particulate material.

4. The method of claim 1, wherein the particulate material is formed from alumina, an aluminosilicate, an acrylic resin, polyethylene, polypropylene, polyethylene oxide, polypropylene oxide, polyethyleneimine, polystyrene, a polyurethane, a polyurea, a polyester, a polyamide, a polyimide, poly(ether ether ketone) (PEEK), poly(ether ketone ketone) (PEKK), poly(ether ketone) (PEK), poly(arylether ketone) (PAEK), poly(ether ether ketone ketone) (PEEKK), poly(ether ketone ether ketone ketone) (PEKEKK), carboxymethyl cellulose, a gelatin, a starch, chitin, chitosan, or a combination of two or more of the foregoing.

5. The method of claim 1, wherein the particulate material is formed from a ceramic material or a polymeric material.

6. The method of claim 1 further comprising forming a fourth cross-sectional layer of the object over portions of the third cross-sectional layer, wherein the fourth cross-sectional layer is electrically conductive.

7. The method of claim 6, wherein the fourth cross-sectional layer is configured to electrically contact portions of the second cross-sectional layer.

8. The method of claim 6, wherein the fourth cross-sectional layer is electrically isolated from the second cross-sectional layer.

9. An object made by additive manufacturing, the object comprising:

a plurality of insulating layers being bonded to one another in a z-direction; and at least a first electrically conductive layer and a second electrically conductive layer disposed between portions of the plurality of insulating layers, the first electrically conductive layer comprising a first surface and a second surface, wherein the first surface is bonded to at least one layer of the plurality of insulating layers and the second surface is bonded to the second electrically conductive layer, and wherein the first and second surfaces are parallel to one other and orthogonal to the z-direction.

10. The object of claim 9, wherein the first and second electrically conductive layers comprise silver, gold, copper, or a combination thereof.

11. The object of claim 9, wherein the first and second electrically conductive layers are thinner than at least one layer of the plurality of insulating layers.

12. The object of claim 9, wherein the object comprises an embedded sensor.

* * * * *